(12) United States Patent
Kumkar et al.

(10) Patent No.: US 12,059,746 B2
(45) Date of Patent: Aug. 13, 2024

(54) APPARATUS AND METHOD FOR FORMING A LASER BEAM

(71) Applicant: TRUMPF LASER GMBH, Schramberg (DE)

(72) Inventors: Malte Kumkar, Weimar (DE); Daniel Grossmann, Schramberg (DE); Daniel Flamm, Ludwigsburg (DE); Hao Pang, Ditzingen (DE)

(73) Assignee: TRUMPF LASER GMBH, Schramberg (DE)

( * ) Notice: Subject to any disclaimer, the term of this patent is extended or adjusted under 35 U.S.C. 154(b) by 504 days.

(21) Appl. No.: 17/387,168

(22) Filed: Jul. 28, 2021

(65) Prior Publication Data

US 2021/0354237 A1 Nov. 18, 2021

Related U.S. Application Data

(63) Continuation of application No. PCT/EP2020/052308, filed on Jan. 30, 2020.

(30) Foreign Application Priority Data

Jan. 31, 2019 (DE) .......................... 102019201280.9

(51) Int. Cl.
*B23K 26/073* (2006.01)
*B23K 26/06* (2014.01)
(Continued)

(52) U.S. Cl.
CPC ........ *B23K 26/067* (2013.01); *B23K 26/0643* (2013.01); *G02B 27/0905* (2013.01)

(58) Field of Classification Search
CPC . B23K 26/073; B23K 26/067; B23K 26/0643
See application file for complete search history.

(56) References Cited

U.S. PATENT DOCUMENTS

| 6,566,627 B2 | 5/2003 | Bradinger et al. |
| 9,442,295 B2 | 9/2016 | Matsumoto et al. |

(Continued)

FOREIGN PATENT DOCUMENTS

| CN | 106735875 | 5/2017 |
| DE | 102013212613 | 12/2014 |

(Continued)

OTHER PUBLICATIONS

CN Office Action in Chinese Appln. No. 202080011791.1, mailed on Jun. 30, 2023, 10 pages (with English translation).

(Continued)

*Primary Examiner* — Ryan D Howard
(74) *Attorney, Agent, or Firm* — Fish & Richardson P.C.

(57) ABSTRACT

An apparatus for forming a laser beam can include a controllable spatial light modulator, a control device for controlling the light modulator, and a beam guiding optical unit, wherein the control device is configured to split a display plane of the light modulator into a plurality of display regions and to represent a first beam influencing structure in at least one first display region of the plurality of display regions and a second beam influencing structure in a second display region of the plurality of display regions, wherein the beam guiding optical unit is configured to cause the laser beam to interact along the direction of propagation thereof firstly with the first display region and then with the second display region.

18 Claims, 2 Drawing Sheets

(51) Int. Cl.
    *B23K 26/067* (2006.01)
    *G02B 27/09* (2006.01)

(56) References Cited

U.S. PATENT DOCUMENTS

| | | |
|---|---|---|
| 9,784,980 B2 | 10/2017 | Inoue et al. |
| 11,020,903 B2 | 6/2021 | Herzog et al. |
| 2011/0170163 A1 | 7/2011 | Taillon et al. |
| 2014/0211174 A1 | 7/2014 | Miyake et al. |
| 2014/0251963 A1 | 9/2014 | Kawaguchi et al. |
| 2015/0001408 A1 | 1/2015 | Frank et al. |
| 2015/0049376 A1 | 2/2015 | Matsumoto et al. |
| 2015/0131142 A1 | 5/2015 | Matsumoto et al. |
| 2016/0124221 A1 | 5/2016 | Huang et al. |
| 2018/0173001 A1* | 6/2018 | Frank ................. G02B 27/0961 |

FOREIGN PATENT DOCUMENTS

| | | |
|---|---|---|
| DE | 112013002095 | 1/2015 |
| DE | 112014002729 | 3/2016 |
| DE | 112013002113 | 3/2019 |
| JP | H10223959 | 8/1998 |
| JP | 2014202956 | 10/2014 |
| JP | 6302403 | 3/2018 |
| JP | 2018070995 | 5/2018 |
| KR | 1020150146435 | 12/2015 |
| WO | WO 2001/022131 | 3/2001 |
| WO | WO 2019/200977 | 10/2019 |

OTHER PUBLICATIONS

CN Office Action in Chinese Appln. No. 20208001179.1, dated Oct. 8, 2023, 14 pages (with English translation).

KR Office Action in Korean Appln. No. 1020217027891, dated Feb. 14, 2023, 10 pages (with English translation).

DE Office Action in German Appln. No. 102019201280.9, dated Sep. 17, 2019, 12 pages (with English translation).

Hendriks et al., "The generation of flat-top beams by complex amplitude modulation with a phase-only spatial light modulator," Laser Beam Shaping XIII, International Society for Optics and Photonics., Oct. 15, 2012, 8490, 8 pages.

Pal et al., "Generating flat-top beams with extended depth of focus," Applied Optics, Jun. 1, 2018, 57(16):4583-9.

PCT International Search Report and Written Opinion in International Appln. No. PCT/EP2020/052308, dated Aug. 5, 2020, 32 pages.

* cited by examiner

APPARATUS AND METHOD FOR FORMING A LASER BEAM

CROSS REFERENCE TO RELATED APPLICATIONS

This application is a continuation of and claims priority under 35 U.S.C. § 120 from PCT Application No. PCT/EP2020/052308, filed on Jan. 30, 2020, which claims priority from German Application No. 10 2019 201 280.9, filed on Jan. 31, 2019. The entire contents of each of these priority applications are incorporated herein by reference.

TECHNICAL FIELD

The invention relates to an apparatus and a method for forming a laser beam.

BACKGROUND

The form of laser beams can be influenced by for example diffractive optical elements or spatial light modulators, wherein a phase distribution and/or an intensity distribution in a cross-sectional plane of the laser beam can be changed. Apparatuses for forming a laser beam are often intensive in respect of structural space and/or have only a little flexibility with regard to the forming of the laser beam. Furthermore, open-loop or closed-loop control of the forming of the laser beam is generally not possible, or possible only with difficulty, for example, indirectly.

SUMMARY

The invention relates to providing an apparatus and a method for forming a laser beam.

In one aspect creating an apparatus for forming a laser beam is described, including a controllable spatial light modulator, and a control device configured for controlling the light modulator. The control device can be operatively connected to the light modulator for the control thereof. The apparatus additionally comprises a beam guiding optical unit. The control device can be configured to split a display plane of the light modulator into a plurality of display regions and to represent a first beam influencing structure in at least one first display region of the plurality of display regions and a second beam influencing structure in a second display region of the plurality of display regions. The beam guiding optical unit is configured to cause the laser beam to interact along the direction of propagation thereof—for example as viewed from a laser beam source of the laser beam or an upstream display region—firstly with the first display region and then with the second display region. The apparatus proposed here is embodied particularly compactly since the same spatial light modulator is used at least twice to influence the laser beam by virtue of the display plane of said light modulator being correspondingly split into a plurality of display regions and different beam influencing structures being represented in the different display regions. It is thus possible to save structural space for the apparatus. The apparatus is very flexible, moreover, since different beam influencing structures can be represented in the different display regions as necessary with the aid of the controllable spatial light modulator and the control device, such that ultimately the functionality of the apparatus for forming the laser beam can be changed straightforwardly and rapidly in virtually any desired way. The laser beam can be modified depending on the processing strategy for a workpiece to be processed with the laser beam. A digital tool change can thus be realized. Furthermore, it is possible to compensate for errors in the laser beam that result from the laser beam source and/or the beam path, for example.

A controllable spatial light modulator is understood to mean, a device configured to influence light, e.g. a laser beam, in two dimensions, wherein said device is configured to influence at least one of a phase distribution, a polarization distribution, an intensity or amplitude distribution and/or a direction of propagation of the light, for example the laser beam. In this example, it is possible to influence the phase distribution and polarization distribution and/or intensity or amplitude distribution in two dimensions, and at the same time to influence the direction of propagation of the light. The influencing of the direction of propagation can result indirectly from the influencing of the phase distribution. The fact that the spatial light modulator is controllable means that the influencing of the light by the spatial light modulator is adjustable, for example, pre-definable, wherein it can be changed in particular in a targeted manner and on request.

The spatial light modulator can be electrically and/or optically controllable; for example it is electronically controllable. Such a spatial light modulator is also referred to by the abbreviation SLM. Hereinafter, the controllable spatial light modulator is also referred to as light modulator for short.

In an example, the light modulator can be digitally controllable. The control device can be configured to digitally control the light modulator. This enables a particularly flexible control of the light modulator and thus at the same time a flexible use of the apparatus.

In accordance with one embodiment, the light modulator is embodied as a liquid crystal display. In certain embodiments the light modulator is embodied as an LCOS-SLM (Liquid Crystal on Silicon-Spatial Light Modulator).

In an example, the apparatus can include one controllable spatial light modulator.

The control device can be freely programmable. The influencing of the light by the light modulator can thus be predefined flexibly and freely.

The fact that the display plane of the light modulator can be split into a plurality of display regions means that the display plane can be split into at least two display regions. It is possible for the control device to be configured to split the display plane into, for example, two display regions. However, it is also possible for the control device to be configured to split the display plane into more than two display regions, e.g. into three display regions.

In this respect, it is possible for the first display region and second display region to be the sole display regions of the display plane. However, it is also possible for the display plane to have more display regions than the first display region and the second display region. It is then possible for the first display region to be the display region with which the laser beam interacts first along the direction of propagation thereof, and for the second display region to be that display region with which the laser beam interacts directly after the interaction thereof with the first display region—without interaction with another display region therebetween. However, the first display region and the second display region can also be arbitrary display regions of a plurality of display regions greater than two, for example, display regions directly adjacent to one another along the propagation of the laser beam, but also display regions spaced apart from one another by at least one further display region. Furthermore, it is possible for the laser beam to interact with at least one further display region before it impinges on the first display region, and/or for the laser beam to interact with at least one further display region after it has interacted with the second display region.

The fact that the laser beam interacts with a display region means that the laser beam can impinge on the display region, for example, can be is reflected by the display region. Alternatively, in accordance with another embodiment, it is also possible for the laser beam to pass through the display region or to be guided through the display region. In this case, the display region transmits the laser beam.

The words "downstream" and "upstream" are used hereinafter with reference to the propagation of the laser beam. The fact that a first element is arranged "upstream" of a second element thus means that the laser beam, along the propagation thereof, impinges firstly on the first element and then on the second element. Accordingly, the second element is then arranged "downstream" of the first element.

In accordance with one aspect, provision is made for the beam guiding optical unit to have at least one mirror arranged to direct the laser beam coming from the first display region to the second display region. In this regard, it is possible, in a simple and compact manner, for the laser beam to interact directly in succession firstly with the first display region and then with the second display region. The fact that the laser beam comes from the first display region means that the laser beam in the direction of propagation—as viewed proceeding from the laser source—firstly passes the first display region and then impinges on the mirror.

The beam guiding optical unit can be configured to focus the laser beam, that is to say to cause the laser beam to converge, as the latter is on its way to the second display region, and/or to image the first display region onto the second display region. The beam guiding optical unit can have at least one spatial filter, for example, to remove undesired beam portions. The at least one spatial filter can be embodied as a stop or as a diffractive element.

In accordance with one configuration, provision is made for the beam guiding optical unit to have an imaging optical apparatus, in particular one imaging optical element or a plurality of imaging optical elements, for example a lens, e.g. a converging lens, in the beam path between the first display region and the second display region. It is also possible for the mirror itself to be embodied as an imaging optical element, in particular to have a lens function, for example to be embodied as a concave mirror. In the case of this configuration, provision can be made for both the first display region and the second display region to be arranged in each case in a focal plane of the imaging optical apparatus. In this respect, a 2f apparatus is realized. However, it is also possible for a higher multiple of a 2f apparatus to be realized, in such a way that a last focal plane of the apparatus is a Fourier plane of the object plane of the apparatus, for example of the first display region. In one example the second display region can be arranged in a Fourier plane of the first display region. This can be realized with an nf apparatus, wherein n is a natural number divisible by 2, but not by 4 (2f, 6f, 10f apparatus, etc.).

The reference to an nf apparatus should not be understood restrictively to the effect that all focal lengths of the optical elements used for the apparatus must be identical. This may indeed be the case in accordance with one embodiment. However, in accordance with another embodiment, it is also possible for at least one optical element of the apparatus to have a focal length that is different than a focal length of at least one other optical element of the apparatus. This last may be the case, in particular, if the nf apparatus has a telescope. The designation "nf" thus relates generally to n focal lengths arranged in succession, but on no account does it relate mandatorily specifically to n identical focal lengths.

In an embodiment it is possible to realize a 6f apparatus, with at least one spatial filter. In this case, a first imaging optical element carries out focusing and/or Fourier transformation. In a focal plane of said first imaging optical element, in an upstream 2f apparatus, there can be arranged a spatial filter that removes undesired beam portions. Subsequently, there can be arranged a 4f apparatus of optical elements disposed downstream of the 2f apparatus, by means of which the laser beam, in an embodiment, is imaged onto the second display region in a magnified fashion. This enables the use of a larger number of pixels in the second display region and thus an improved resolution. This in turn enables the forming of, for example, large laser beams, for example for logos, images and/or intensity profiles. The 2f apparatus with the spatial filter, and the subsequent 4f apparatus overall produce the 6f apparatus. Spatial light modulators have the property of transmitting or reflecting in principle even uninfluenced background radiation, which is also referred to as zeroth order. The spatial filter of the upstream 2f apparatus can be used to remove this undesired zeroth order and preferably higher orders of diffraction.

Alternatively or additionally, it is possible for the first display region itself to have imaging properties, for example, for the first beam influencing structure of the first display region to have imaging properties. In this case, the second display region can be arranged in a focal plane of the first display region. In this respect, a 1f apparatus is realized. In this case, too, however, with the inclusion of the first display region as an imaging optical element, it is possible to realize a higher apparatus, in particular a 2f apparatus, or a 6f apparatus, analogously to the explanation given above.

In accordance with one aspect, provision is made for the apparatus to have a diagnosis device configured to ascertain at least one property of a test beam coming from at least one display region of the plurality of display regions. It is thus possible to test the effect of the at least one display region observed by means of the diagnosis device.

The diagnosis device can have an optical recording device for, for example, electronic recording of an image, e.g. two-dimensional imaging, and also an evaluation device, wherein the evaluation device is operatively connected to the recording device in order to evaluate an image recorded by the recording device. The diagnosis device can have a camera as recording device and a computing device as evaluation device, wherein it is possible for the diagnosis device to be embodied as a camera with an integrated computing device.

In accordance with one embodiment, however, the evaluation device can also be part of the control device, or the function of the evaluation device can be integrated into the control device, such that the control device is the evaluation device. For example, the function of the evaluation device can be integrated into the control device as a hardware module or software module.

The diagnosis device can be configured to control the light modulator. For this purpose, in accordance with one embodiment, the diagnosis device can have a separate diagnosis control device, or a control function can be integrated or implemented in the computing device—embodied as evaluation device—of the diagnosis device. However, it is also possible for the corresponding control function of the diagnosis device to be integrated or implemented—in particular as a hardware module or software module—in the control device of the apparatus for forming the laser beam.

In accordance with another aspect, provision is made for the apparatus to comprise an output coupling optical unit configured and arranged to direct the test beam coming from the at least one display region of the plurality of display regions onto the diagnosis device, in particular onto the recording device.

In accordance with one configuration, provision is made for the output coupling optical unit to be configured to couple out a partial beam of the laser beam as test beam from a beam path of the laser beam and to direct it onto the diagnosis device, in particular onto the recording device. In this case, the output coupling optical unit can be embodied in particular as a partly transparent mirror or as a diffractive optical element. It is configured to couple out between 0.01% and 10%, in one example, less than 1%, in another example less than 0.01%, of the light power of the laser beam from the beam path and to direct it onto the diagnosis device. In this case, it is possible to test directly the effect of the observed display region on the laser beam itself.

In accordance with another configuration, provision is made for the laser beam itself to be used as test beam. In this case, by means of the diagnosis device it is possible to examine directly the effect of the light modulator on the laser beam. Since in this case the full power of the laser beam—optionally with a reduced power level—is guided onto the diagnosis device, simultaneous processing of a workpiece is not possible. In this case, therefore, the diagnosis of the laser beam by means of the diagnosis device can be provided as a separate operating mode to which the apparatus can be switched as necessary, in particular switched over from a processing mode, or which can be activated as necessary. For example, after the end of the diagnosis, it is possible to switch over to the processing mode, wherein the laser beam in the processing mode is guided onto a workpiece to be processed.

In accordance with another configuration, provision is made for—e.g. in parallel with the laser beam—an additional test beam different than the laser beam to be sent through the apparatus at least regionally, wherein the test beam interacts with the at least one display region to be observed and—in one example as far as the output coupling optical unit—passes through the same beam path as the laser beam. In this case, however, the test beam can have a different wavelength than the laser beam. In an embodiment, the output coupling device is configured to separate the test beam dichroically from the laser beam and thus to couple out only the test beam, but no beam portions of the laser beam, from the beam path. With the diagnosis device, it is possible to test the effect of the at least one observed display region on the test beam and straightforwardly to deduce the effect of the display region on the laser beam, without power of the laser beam having to be coupled out from the beam path. The use of an additional test beam different than the laser beam enables, moreover, a change or an alteration in the power of the laser beam, for example in the event of a change of processing parameters, that does not result in problems with a dynamic range of the diagnosis device. Rather, the power of the additional test beam can be chosen independently of the instantaneous power of the laser beam and can be coordinated in particular with the dynamic range of the diagnosis device.

Furthermore, with the use of a test beam different than the laser beam, it is possible to observe a plurality of display regions, even all display regions of the light modulator, simultaneously. In this case, the additional test beam does not follow the beam path of the laser beam, but rather impinges simultaneously on a plurality of display regions, in particular on all display regions, of the light modulator and is subsequently guided onto the diagnosis device, which then preferably performs a regional evaluation. The additional test beam different than the laser beam is can be generated by a separate beam source, for example by a laser diode or a light emitting diode, e.g. an LED. By way of the separate beam source, preferably a defined, linear polarization of the additional test beam is generated, optionally by means of a polarizer additionally provided.

The output coupling optical unit is can be configured to image the light modulator, for example at least one display region of the light modulator, onto the diagnosis device, for example, onto the recording device.

The output coupling optical unit can be configured optionally to image different display regions of the plurality of display regions onto the diagnosis device. For this purpose, imaging properties of the output coupling optical unit can be changeable, such that a desired display region can be imaged onto the diagnosis device as necessary.

In accordance with one embodiment, the diagnosis device is integrated into the apparatus for forming the laser beam, that is to say is part of the apparatus for forming the laser beam.

In accordance with another embodiment, the diagnosis device is embodied as a separate, independent device that can be used together with the apparatus. In this case, the separately embodied diagnosis device can have at least the output coupling optical unit and the recording device, and also, in some examples, the evaluation device. In an embodiment the diagnosis device additionally has a separate control device for controlling the light modulator. The diagnosis device can be operatively connectable to the control device of the apparatus for forming the laser beam in order to control the light modulator by means of the control device of the apparatus. In an embodiment, the diagnosis device furthermore has a polarization separating device arranged in the beam path of the test beam between the light modulator and the recording device if the diagnosis device is used with the apparatus for forming the laser beam.

In accordance with an embodiment, provision is made for the diagnosis device to be operatively connected to the control device in order to control the light modulator depending on an evaluation of at least one property of the test beam, said evaluation being performed by the diagnosis device. In this way, feedback between the diagnosis device and the light modulator is created and makes it possible to change the effect of the light modulator on the laser beam depending on the evaluation by the diagnosis device. In an example, the diagnosis device and the control device are configured to control properties of the laser beam that are influenced by the light modulator. In one example, control with a closed control loop can be provided (closed-loop control). The control can be effected on the basis of freeform (phase) surfaces and/or other suitable algorithms. In an example a—preferably noise-resistant—optimization algorithm can be implemented in the computing device, for example an evolutionary or genetic algorithm or a neural network, in order to optimize the effect of the light modulator on the laser beam with regard to at least one desired property thereof.

At least one property of the test beam can be evaluated by the diagnosis device. For example, an amplitude distribution, an intensity distribution, a phase distribution, or a polarization distribution in an image plane of the diagnosis device, e.g. in an image plane of the recording device. The imaging onto the image plane can be chosen by means of the output coupling optical unit—such that the electric field of the test beam in the image plane in terms of phase distribution and amplitude distribution—if appropriate apart from a scaling and/or change in polarization—is equal to the electric field of the laser beam at the location of a predetermined target plane—for example a processing plane for processing a workpiece. In this way, it is possible to examine directly the desired property of the laser beam in the target plane. With the use of a test beam different than the laser beam, in accordance with one embodiment, it is also possible to obtain an image of a beam influencing structure that is encoded by polarization. For example, the test beam can impinge on the light modulator in a linearly polarized manner such that a beam influencing structure provided for the phase influencing of the laser beam acts on the polarization of the test beam pixel by pixel, such that the polarization of said test beam can ultimately be used as code for the phase information of the beam influencing structure observed. Consequently, in particular deviations between the measured phase influencing structure and a calculated phase influencing structure can then be used for the purpose of correction. The polarization of the test beam upon impinging on the phase influencing structure to be observed can be chosen in a manner deviating from the polarization of the laser beam, such that the phase influencing structure to be observed locally changes the polarization of the test beam, but leaves the polarization of the laser beam uninfluenced. If the diagnosis device is used in combination with a polarization separating device, a change in polarization brought about by the light modulator can be converted into a change in intensity by means of the polarization separating device; in this case, the amplitude distribution in the image plane of the diagnosis device deviates from that in the target plane.

In accordance with one embodiment, the diagnosis device is configured to check a polarization of the test beam for each pixel of the observed display region of the light modulator. For this purpose, the diagnosis device can have a polarization microscope or be configured to effect a polarization microscope recording of the observed display region. It is thus possible to check the light modulator in the observed display region pixel by pixel in respect of whether errors occur in comparison with a desired polarization rotation, wherein these errors can then be compensated for by suitable pixel-by-pixel adaptation of the control of the light modulator. For example, ageing of the light modulator can be compensated for in this way.

In another aspect, for example, in combination with the apparatus proposed here e.g. combination with at least one feature of the apparatus—a diagnosis device is created which is configured to calibrate a controllable light modulator, for example, the light modulator of the apparatus, by control of the light modulator being tuned over a control interval, wherein for at least two control regions of the light modulator an intensity, assigned to the respective control region, of a test beam interacting with the light modulator, depending on the control of the light modulator, is detected by means of an optical recording device of the diagnosis device, wherein the respective intensities in the case of identical control are compared with one another, and wherein a correction of the control for the at least two control regions is ascertained on the basis of the comparison. The diagnosis device is thus advantageously able to detect differing behavior of different control regions of the light modulator in the case of identical control, and then to provide a suitable calibration for the light modulator in order to compensate for these individual differences in the reaction of the different control regions.

It is therefore possible to obtain a reproducible response of the light modulator over a plurality of control regions.

The diagnosis device in accordance with a further aspect can be the above-described diagnosis device of the apparatus. The optical recording device is preferably the above-described optical recording device of the above-described diagnosis device of the apparatus.

In an embodiment, the diagnosis device is embodied as a measuring module. The diagnosis device can have an optical unit, e.g. the above-described output coupling optical unit of the apparatus, which is configured to image at least one display region of the light modulator onto the recording device.

The diagnosis device can be configured to calibrate at least one display region of the light modulator. In an embodiment, the diagnosis device can be configured to calibrate a plurality of display regions of the light modulator—successively or simultaneously. For example, the diagnosis device can be configured to calibrate all display regions of the light modulator simultaneously, e.g. jointly.

The diagnosis device can be configured to tune the control of the light modulator interacting with the test beam, for example, of the light modulator irradiated with the test beam, over the control interval.

A control interval can be a scale range for the control of the light modulator over which the control can be varied. If, for example, a control range of the digitally controllable light modulator is 8 bits, the entire control interval comprises the numerical values from 0 to 255. In particular, grayscale levels of the light modulator can correspond to these numerical values.

The control of the light modulator is tuned over the entire control interval. In the example of a control range of 8 bits, therefore, all control values from 0 to 255 are available—for example temporally successively, e.g. in ascending or descending order. In an embodiment, however, it is also possible for the control of the light modulator to be tuned only over one subrange or over a plurality of subranges of the control interval. In one embodiment, the subranges do not overlap one another. The subranges can be spaced apart from one another, i.e. they do not directly adjoin one another.

The tuning of the control can be carried out for all pixels of at least one display region or of the entire light modulator, for example simultaneously, which corresponds to homogeneous control of the at least one display region or of the entire light modulator. A homogeneous grayscale value image over the entire light modulator, or at least over the examined display region of the light modulator can be obtained. However, it is also possible for the control to be carried out only for a selection of pixels of the light modulator. By way of example, it is possible for the control to be carried out only for a selection of pixels of the light modulator that is relevant in the sense that these pixels actually interact with or are irradiated by the test beam.

A control region can be, an individually controlled region of the light modulator. Such a control region can be a single pixel or a pixel region, i.e. a contiguous group of jointly controlled pixels.

The control regions can be imaged—for example by the output coupling optical unit—on the recording device. As a result, the individual control regions can respectively be assigned an intensity on the recording device. A one-to-one imaging of individual pixels or pixel regions of the light modulator onto individual pixels or pixel regions of the recording device is possible in this case. A magnification or reduction is also possible, for example a single pixel of the light modulator is imaged onto a pixel region of the recording device, or conversely a pixel region composed of a plurality of pixels of the light modulator is imaged onto a single pixel of the recording device.

The diagnosis device can be configured to create a correction mask. Such a correction mask can be a correction map with correction values assigned to the different control regions of the light modulator for the correction of the respective control. The diagnosis device can be configured to communicate the correction mask—in real time or temporally independently in stored form—to the control device of the apparatus for correspondingly corrected, that is to say calibrated, control of the light modulator.

In accordance with another aspect, provision is made for the diagnosis device to have a polarization separating device arranged between the light modulator and the recording device. The polarization separating device is configured to carry out polarization filtering of different polarized beam portions of the test beam. In an embodiment, the polarization separating device can be the polarization separating device of the beam forming optical unit of the apparatus, which will also be described below. The polarization separating device can be arranged upstream of the optical unit, for example, upstream of the output coupling optical unit, along the beam path of the test beam. The polarization separating device can be embodied as a thin-film polarizer (TFP) or includes a thin-film polarizer. It is alternatively possible for the polarization separating device to be embodied as a polarization beam splitter. It is possible for the polarization separating device to have an adjustable $\lambda/2$ plate upstream of the thin-film polarizer, by means of which plate the polarization changed by the light modulator can be aligned with the thin-film polarizer.

The diagnosis device can be configured, if, for example, a linear polarization of the test beam is oriented on the light modulator—e.g. relative to the light modulator—such that the light modulator changes a polarization state of the test beam depending on its control, to determine a phase shift between intensity profiles of the at least two control regions that are detected depending on the control, and to ascertain the correction dependent on the phase shift. This enables functionally reliable and simple ascertainment of the correction, for example creation of the correction mask. The polarization vector of the linearly polarized test beam here can be aligned such that it is not aligned parallel to a crystal axis of the crystals of the light modulator, for example the vector can be aligned at approximately 45°, e.g. 45°, with respect to a first crystal axis of the crystals.

In this embodiment, the polarization state of the test beam can be changed locally by the light modulator.

In this embodiment, the polarization state of the test beam can be how the beam is polarized, for example linearly, elliptically, or circularly, and/or what direction of polarization the test beam has.

In order to represent the functioning of the calibration illustratively, the light modulator in this embodiment can act like a $\lambda/2$ plate, the polarization-rotating property of which is changed by the tuning of the control over the control interval. In this embodiment, the direction of polarization of the test beam can be rotated during the tuning of the control of the light modulator in interaction with the polarization separating device, thus resulting, in an—e.g. periodically—varying intensity profile on the recording device. The polarization state of the test beam can experience a phase change in accordance with the crystal axes.

In this embodiment, the respective phase angle of this intensity varying, in particular periodically, depending on the control depends on the locally different properties of the control regions, in particular of the individual pixels of the light modulator.

Therefore, if the different phase angles of the intensity profiles that are assigned to the individual control regions are compared with one another, and, for example, the respective phase deviations are ascertained, the local deviations in the behavior of the individual control regions can be deduced therefrom. A corresponding correction for the control can be ascertained, in the form of a correction mask. The corresponding phase distribution that fluctuates over the different control regions. Pixels of the light modulator, can be standardized, e.g. homogenized, by the suitable correction of the control.

Since the behavior of the individual control regions, e.g. pixels, drifts apart again as time progresses, for example, as interaction with the laser beam progresses, the corresponding calibration process can be carried out continuously or regularly repeated. In an embodiment, a spatially resolved comparison of a target intensity distribution with an actual intensity distribution on the recording device after polarization separation can be carried out.

In an embodiment, the diagnosis device is integrated into a processing head of the apparatus. Alternatively, the calibration can be repeated by the separately provided diagnosis device and/or in a separately provided calibration mode of the apparatus.

In accordance with another aspect, provision is made for the diagnosis device to be configured to ascertain—globally or locally—the correction of the control for a plurality of control regions depending on a beam parameter and/or a beam effect of the test beam on the light modulator, wherein the beam parameter is preferably selected from a group consisting of: a fluence, an intensity, and an average power; the beam effect can be a temperature. This is in addition or as an alternative to the above-described correction of the control for the individual control regions. In this respect, it has been found that the behavior of the light modulator, for example, the influence of the individual control regions on the polarization of the laser beam, can be dependent on the beam parameter and/or the beam effect, e.g. as the individual liquid crystals of the light modulator become aligned in the electric field of the laser beam. In an embodiment, different liquid crystals can become aligned differently depending on the local field strength. Therefore, the light modulator can be calibrated depending on the at least one beam parameter and/or the beam effect.

In accordance with another aspect, the apparatus comprises a beam forming optical unit configured to change a polarization of the laser beam between the first display region and the second display region. The beam forming optical unit can be configured to rotate a linear polarization of the laser beam between the first display region and the second display region. This makes it possible, to maintain the polarization of the laser beam in one of the display regions, e.g. the first display region, but to locally influence the polarization of the laser beam in another display region of the display regions, e.g. the second display region It is possible for the laser beam to impinge on the first display region initially with a specific linear polarization that allows, in the first display region, the polarization of the laser beam to be left uninfluenced. In another example, the phase of the laser beam, but not the polarization thereof, can be locally influenced. For example, the linear polarization of the laser beam can be aligned parallel to a crystal axis of the crystals of the light modulator. In the beam path between the first display region and the second display region, the linear polarization of the laser beam can then be rotated such that the polarization of the laser beam can be influenced locally, for example pixel by pixel, by the second display region. For this purpose, the linear polarization of the laser beam can be rotated such that it is no longer parallel to either of the two crystal axes of the crystals (e.g. birefringent crystals) of the light modulator. Suitable influencing of the individual crystals of the light modulator then makes it possible in turn for the local polarization of the laser beam to be influenced pixel by pixel on account of the birefringent effect of said crystals.

The beam forming optical unit can be controllable, such that the polarization of the laser beam can be changed variably, for example in a predetermined manner, as required between the first display region and the second display region. It is possible for the polarization of the laser beam optionally not to be changed or to be changed by the beam forming optical unit.

The beam forming optical unit can have a $\lambda/2$ plate upstream of the first display region—as viewed in the direction of propagation of the laser beam—in order to align a linear polarization of the laser beam in a defined manner.

In an embodiment, the beam forming optical unit can have a deflection mirror between the first display region and the second display region, wherein a $\lambda/4$ plate is arranged upstream of the deflection mirror in such a way that the laser beam passes through the $\lambda/4$ plate twice, once before impinging on the deflection mirror and a second time after impinging on the deflection mirror. In this case, in an embodiment, the deflection mirror is the mirror which the beam forming optical unit has in order to direct the laser beam coming from the first display region to the second display region. Therefore, in an embodiment, the deflection mirror is assigned both to the beam guiding optical unit and to the beam forming optical unit. By means of the $\lambda/4$ plate arranged in this way, the linear polarization of the laser beam is rotated by a defined angle between the first display region and the second display region. In an example, the $\lambda/4$ plate is rotated by 22.5° relative to the polarization vector of the laser beam coming from the first display region, such that said polarization vector is rotated by 45° after passing through the $\lambda/4$ plate twice.

As an alternative to the one deflection mirror with upstream $\lambda/4$ plate, it is also possible to guide the laser beam between the first display region and the second display region via at least two deflection mirrors, wherein a $\lambda/2$ plate is arranged between the two deflection mirrors and enables the polarization of the laser beam to be rotated analogously to the above-described effective effect of the $\lambda/4$ plate.

In another aspect, the beam forming optical unit has a polarization separating device, also referred to as polarization filtering device, configured to carry out polarization filtering of differently polarized beam portions of the laser beam coming from the second display region, for example, to separate differently polarized beam portions of the laser beam coming from the second display region from one another. This enables defined and selective forming of the laser beam, but also the representation of intensity profiles, for example, influencing of the amplitude or intensity distribution of the laser beam. The polarization of the laser beam can be set in a locally two-dimensionally defined manner by the second display region, and then by means of the polarization separating device polarized beam portions of the laser beam can be at least partly damped or disposed of. For example, specific beam portions which come from specific pixels of the second display region remain downstream of the polarization separating device, or specific beam portions which come from specific pixels of the second display region are attenuated in a defined manner downstream of the polarization separating device. The laser beam can, therefore, be formed virtually arbitrarily with high definition, wherein the intensity distribution of the laser beam in the cross-sectional plane thereof can assume arbitrary geometries that can be set variably by means of the beam forming optical unit. In this embodiment, a binary separation of polarizations is possible, but intensity profiles are also representable, for example by means of splitting into a transmitted portion and a reflected portion, for example 30% transmission and 70% reflection, being realized for the direction of polarization coming from a specific pixel.

The polarization separating device is arranged—as viewed in the direction of propagation—downstream of the second display region. The polarization separating device can have a thin-film polarizer (TFP), and can have an adjustable $\lambda/2$ plate upstream of the thin-film polarizer, which plate enables the polarization changed by the light modulator to be aligned with the thin-film polarizer. In some cases the effect of the light modulator by itself is insufficient for aligning the polarization with the thin-film polarizer in a suitable manner. Additionally or alternatively, the adjustable $\lambda/2$ plate can be used to set what fraction of the intensity of the laser beam is separated in a polarization-dependent manner by the thin-film polarizer.

The beam portions separated by the thin-film polarizer can be directed into a beam dump and thus eliminated.

In accordance with another aspect, provision is made for the beam forming optical unit to be configured to be switchable between a first, switched-off functional state of the beam forming optical unit and a second, switched-on functional state of the beam forming optical unit. In this case, the polarization of the laser beam is changed between the first display region and the second display region in the second, switched-on functional state, and not changed in the first, switched-off functional state. In this way, it is possible to select variably and as required whether the polarization of the laser beam is intended to be changed between the first display region and the second display region, and thus at the same time The beam forming optical unit can be configured to be switchable by virtue of at least one optical element of the beam forming optical unit being displaceable spatially optionally into a beam path of the laser beam and out of the beam path. For this purpose, in an embodiment, a suitable, preferably automatically controllable, displacement mechanism is provided.

Alternatively or additionally, the at least one optical element of the beam forming optical unit can be switchable between two switching states of the optical element in the beam path of the laser beam. In this case, the optical element remains in the beam path, but is switched back and forth between the two switching states as necessary. In accordance with one configuration, this optical element that is switchable between two switching states is the $\lambda/4$ plate of the beam forming optical unit, which for example in an automated manner, e.g. a motorized manner can be rotated with regard to its orientation relative to the polarization vector of the laser beam coming from the first display region in order optionally to rotate the linear polarization of the laser beam between the first display region and the second display region relative to the crystal axis of the light modulator crystals or to keep it parallel to the crystal axis. For this purpose, the $\lambda/4$ plate can be arranged on a hollow shaft motor, for example. In an analogous manner, it is also possible for a λ/2 plate arranged between two deflection mirrors to be rotated correspondingly. However, the beam forming optical unit can also have a liquid-crystal-based polarization modulator as switchable optical element, which polarization modulator can be switched in particular between an active state and an inactive state, wherein it changes the polarization of the laser beam in the active state and leaves it unaffected in the inactive state.

As already explained above, it is possible for the display plane of the light modulator to be subdivided into more than two display regions, wherein it is possible for the laser beam, before the interaction thereof with the first display region described above, to impinge on a further display region disposed upstream. In accordance with one configuration, it is possible for the first display region described above to be a second display region as viewed along the direction of propagation of the laser beam, wherein the second display region described above is a third display region, wherein an additional first display region, not described above, is disposed upstream of the second display region. In this case, in particular a configuration is possible—which will also be explained in greater detail below in association with the method for forming a laser beam—in which the polarization of the laser beam is changed between the second display region and the third display region, but it is not changed between the newly inserted first display region and the second display region. The third display region would thus locally influence the polarization of the laser beam in the manner described above.

In another aspect, provision is made for the apparatus to comprise a processing optical unit configured to guide the laser beam coming from the light modulator onto a workpiece, for example for the purpose of processing the workpiece by means of the laser beam. The apparatus is thus configured and provided for processing a workpiece. For example material removal by laser drilling, laser milling, laser polishing, laser cutting, or the like, can be carried out by means of the laser beam. Metallic workpieces or Invar films, but also other workpieces, can be processed using the laser beam. For example, a material modification near the surface, a functionalization, a modification in the volume, for example cracking, formation of color centers, writing of optical properties, or a modification between two materials, for example welding, is possible. Moreover, additive processing is possible, in particular for polymers, photoresists or the like. Processing of semiconductors, polymers, polymer films, glass, and ceramics is also possible, ultrashort pulse lasers can be employed.

The laser beam can be generated by the laser beam source such that it has a Gaussian fundamental mode with well-defined linear polarization. The laser beam can be pulsed and have pulse lengths of less than 50 ps, preferably more than 50 fs. However, nanosecond pulses are also possible; moreover, pulse trains, in particular so-called bursts, also gigahertz bursts, can be generated. However, it is also possible to generate pulses having pulse durations on the microseconds time scale. The wavelength of the laser beam can be in particular between 300 nm and 1600 nm, preferably between 450 nm and 1600 nm; in particular, 515 nm or 1030 nm is suitable. However, the wavelength can also lie below or above the range mentioned here.

The processing optical unit can be configured to focus the laser beam, to deflect the laser beam, to reduce the laser beam, to magnify the laser beam, generally to adapt the size of a beam diameter or beam width, generally the size of a cross-sectional plane of the laser beam on a processing plane of the workpiece. It is possible for the processing optical unit to have a telescope. The processing optical unit can also have at least one diffractive optical element, for example to split the laser beam along a plurality of partial beams, for example in order to process a plurality of processing locations simultaneously, or in order to achieve a temporal offset of the laser beams directed onto the workpiece—over different propagation paths of the different partial beams.

The processing optical unit can have a high numerical aperture, in particular of greater than 0.2, and/or a focal length of less than or equal to 20 mm. The processing optical unit can be embodied as a fixed optical unit. It is also possible for the processing optical unit to have a scanner, e.g. a galvanometer scanner, having a lower numerical aperture and/or a longer focal length, for example, having a focal length of more than 50 mm.

In accordance with one embodiment, the processing optical unit has a λ/4 plate in order to circularly or elliptically polarize the laser radiation before impinging on the processing plane. This has advantages in particular with regard to the processing of the workpiece. Even more complex polarization states are possible. By way of example, the processing optical unit can also have an s-waveplate or some other suitable element in order to generate vectorially polarized radiation, e.g. radially polarized or azimuthally polarized radiation.

The processing optical unit can be configured such that the electric field of the laser beam in the plane of the second display region—or of the third display region, or generally of a last display region of the plurality of display regions—in terms of amplitude and phase—if appropriate apart from a magnification, reduction or change in polarization—corresponds exactly to the electric field on the processing plane. The processing optical unit can be embodied as a 4f telescope. The second display region—or the third display region, or generally a last display region of the plurality of display regions—can be imaged onto the processing plane by the processing optical unit.

The processing plane can be the target plane already mentioned above.

In another aspect there is described herein a method for forming a laser beam, wherein the laser beam is firstly caused to interact with a first display region of a controllable spatial light modulator, wherein the laser beam is then caused to interact with a second display region of the controllable spatial light modulator, wherein a first beam influencing structure is generated in the first display region and a second beam influencing structure—e.g. another beam influencing structure, that can be different than the first beam influencing structure—is generated in the second display region by control of the light modulator. Compact, structural-space-saving and flexible forming of the laser beam is possible by means of the method.

An apparatus according to a particular embodiment or an apparatus according to any of the exemplary embodiments described above is used in the context of the method. In this respect, those advantages that have already been explained in association with the apparatus are afforded with regard to the method.

The light modulator can be controlled in real time, e.g. at the time when the method is implemented. The light modulator can be controlled electronically. For example, the light modulator is controlled digitally.

Beam influencing structures are generated in the display regions meaning that beam influencing structures are represented in the display regions.

In an embodiment, a flat-top laser beam (laser beam having a flat-top profile, for short: Flat-Top) is generated by the beam influencing structure of the first display region. While this has advantages for the processing of workpieces, such a laser beam typically has a depth of field range of limited usability. This results from the fact that a phase distribution of the laser beam in a cross-sectional plane thereof, in particular in a focal plane, is not homogeneous; rather, the wavefront or phase front of the laser beam is curved. Alternatively, however, a laser beam with a tailored intensity distribution, for example with a linear intensity increase, or otherwise inhomogeneous intensity distribution, can also be generated by the beam influencing structure of the first display region. By contrast, a flat-top laser beam has a homogeneous intensity distribution.

In accordance with another aspect, in a first functional state, a phase influencing structure is in each case generated as beam influencing structure both in the first display region and in the second display region, wherein the phase influencing structure in the first display region, also referred to as first phase influencing structure, influences a first amplitude distribution of the laser beam after a first propagation distance—downstream of the first display region. In this way, the already mentioned flat-top laser beam with a homogeneous intensity distribution or a laser beam with a deliberately inhomogeneous intensity distribution is generated after the first propagation distance. Aberrations of the laser beam can be additionally rectified, such that ultimately a laser beam with high quality is generated.

The first propagation distance can correspond to the optical distance between the first display region and the second display region, such that the amplitude distribution, e.g. the flat-top distribution, is generated on the second display region.

In accordance with one configuration, the phase influencing structure in the second display region, also referred to as second phase influencing structure, increases the uniformity of a phase distribution in a cross-sectional plane of the laser beam. The phase front of the laser beam can therefore be smoothed and the phase curvature present can be rectified. As a result, the propagation behavior of the laser beam is adapted so that the latter is less divergent and has a larger depth of field range. It is also possible for the phase distribution to be deliberately influenced such that the depth of field range is adapted to a desired processing process. For example, the propagation behavior of the laser beam can be adapted flexibly by way of the choice of the second phase influencing structure. For example, a convergence and/or divergence behavior (convergence and/or divergence angle) of the laser beam can be adapted in a targeted manner by way of the choice of the second phase influencing structure.

In an embodiment, on the basis of the known first phase influencing structure, the phase distribution of the laser beam on the second display region is calculated, e.g. simulated, and then the second phase influencing structure is chosen in such a way that the phase distribution is influenced by the second display region in a desired manner. For example the calculated phase distribution can be numerically inverted and represented in inverted fashion by the light modulator in the second display region. A plane phase distribution and a flat-top intensity distribution can result in the plane of the second display region.

Alternatively or additionally, the second phase influencing structure influences a second amplitude distribution after a second propagation distance—downstream of the second display region. In this way a plurality of aims can be pursued alternatively or simultaneously:

Firstly, it is possible to influence a spatial angular distribution of the laser beam in a targeted manner and thus to form the beam in a desired manner. In an embodiment, for this purpose, a spatial frequency carrier, for example a grating with a well-defined k-vector, is represented on the second display region, wherein deliberately specific undesired beam portions of the laser beam can be diffracted away from the beam path, or only specific, desired beam portions of the laser beam can be diffracted into the further beam path. For example, after a specific propagation distance, undesired beam portions can be separated from desired beam portions, which are also referred to as useful beam, for example, by means of at least one stop. For example, embodiment, a sharpening of the outer contour of the flat-top laser beam is possible in this way, wherein this can be approximated to the diffraction limit. However, arbitrary forms/geometries of the laser beam can also be represented.

Secondly, it is possible deliberately to influence, for example, to increase, or alternatively deliberately to attenuate, the homogeneity of the laser beam, for example deliberately to introduce inhomogeneities into the laser beam. With the aid of the above-described closed-loop control comprising the diagnosis device and the control device, the homogeneity of the laser beam can be adapted, for example by a modulation depth of the phase grating represented in the second display region being locally deliberately influenced. It is also possible to generate intensity profiles, intensity jumps or generally arbitrary intensity distributions. For example, the second amplitude distribution can be deliberately locally influenced and thus changed.

In another aspect, it is provided that, in a second functional state, a phase influencing structure is generated as first beam influencing structure in the first display region and influences the amplitude distribution of the laser beam—for example after the first propagation distance—e.g. the amplitude distribution of the laser beam on the second display region. A polarization of the laser beam is changed between the first display region and the second display region, wherein a polarization influencing structure is generated as second beam influencing structure in the second display region and locally influences the polarization of the laser beam. For this purpose, in an embodiment, the beam forming optical unit explained above is used in the manner explained above.

The laser beam is incident on the first display region preferably with a defined linear polarization, for example, with a polarization vector parallel to a first crystal axis of birefringent crystals of the light modulator, wherein the polarization vector of the laser beam is rotated between the first display region and the second display region, such that it impinges on the second display region at, for example, 45° with respect to the first crystal axis of the crystals of the light modulator. In the second display region, the polarization influencing structure can then locally change, for example pixel by pixel, the polarization of the laser beam in the cross-sectional plane thereof.

Downstream of the second display region, beam portions of the laser beam with specific polarization can be filtered, for example beam portions with specific polarization are at least partly or completely removed from the beam path, or only beam portions with specific polarization are left in the beam path. For example, beam portions of the laser beam with specific polarization are selected as useful beam.

Beam forming of the laser beam can thus be effected in a manner already described in association with the beam forming optical unit.

A specific, two-dimensional intensity distribution can therefore be generated in a targeted manner, which intensity distribution can be used for example for the microstructuring of a workpiece. It is possible to make high pulse energies of a laser source usable for an increased productivity by specific spatial intensity distributions being generated in a targeted manner. Furthermore, tailored spatial intensity distributions prove to be advantageous for various processing processes. The method proposed here enables phase and amplitude of the laser beam to be tailored spatially. The second display region can additionally be used to correct aberrations. However, the first display region, too, can additionally or alternatively be used for correcting aberrations. By means of the polarization filtering/polarization separation, the amplitude distribution of the laser beam can be formed directly in the target plane.

The second display region—or the third display region, or a last display region—can be reduced to the target plane or processing plane by means of the processing optical unit, since then the resolution of the light modulator can be better utilized. In particular, this results in an improved resolution of the intensity distribution of the laser beam on the processing plane or target plane.

The influencing of the polarization of the laser beam by the polarization influencing structure in combination with the subsequent polarization filtering can also be used to sharpen the contour of the laser beam. The polarization can be rotated locally, e.g. pixel by pixel, by means of the polarization influencing structure so as to result in maximum transmission and maximum reflection of the corresponding beam portions at the thin-film polarizer.

Arbitrary masks for amplitude forming can be represented by the light modulator. For example, an optical stamp can be generated.

In accordance with one embodiment, the intensity selected, for example, transmitted, as useful beam by the thin-film polarizer is observed directly by means of the diagnosis device, wherein individual pixels of the light modulator are calibrated and possible drifts or errors on account of thermal effects, ageing or the like can be corrected.

By means of targeted rotation of the local polarization of individual pixels of the light modulator, intensity gradients can be generated, and/or inhomogeneities in the beam form of the laser beam can be compensated for.

In the display region disposed upstream of the display region representing the polarization influencing structure, for example in the first display region, the laser beam can be pre-formed, that is to say pre-influenced in the direction of a target intensity distribution, as a result of which the efficiency of the entire beam forming is significantly improved. If for example a triangle or some other form is intended to be generated, instead of a rectangular flat-top a triangular flat-top or some other corresponding geometry of the laser beam can already be generated in the first display region, such that less intensity is subsequently lost as a result of the polarization separation.

In an embodiment, therefore, in the first display region an amplitude distribution is generated which is approximated to an intensity distribution to be generated by the polarization influencing structure in association with the polarization separating device.

Spatial light modulators have—as already mentioned—the property in principle of also transmitting or reflecting uninfluenced background radiation, which is also referred to as zeroth order. This background radiation need not be filtered separately, but rather can be concomitantly removed by way of the polarization filtering/polarization separation. This in turn advantageously makes it possible to use low-frequency phase masks in particular in the first display region, which entails advantages owing to the limited resolution of the light modulator. Filtering of the zeroth order is also possible, For example, by means of the 6f apparatus described above.

In accordance with another aspect, provision is made for switching over between the first functional state and the second functional state to be effected. In this way, in line with requirements, depending on a processing task for processing a workpiece, it is possible to change over between the different functional states and thus the different ways of influencing the laser beam.

In accordance with another aspect, provision is made for the laser beam downstream of the second display region to be caused to interact with a third display region of the controllable spatial light modulator. In this case, a third beam influencing structure is generated in the third display region by control of the light modulator. Said third beam influencing structure can be different than the first beam influencing structure and the second beam influencing structure. A phase influencing structure is in each case generated as beam influencing structure both in the first display region and in the second display region. The first phase influencing structure in the first display region can influence a first amplitude distribution of the laser beam after a first propagation distance, and the second phase influencing structure in the second display region can increase the uniformity of a phase distribution in a cross-sectional plane of the laser beam and/or influences a second amplitude distribution after a second propagation distance. A polarization of the laser beam can be changed between the second display region and the third display region, wherein a polarization influencing structure is generated as third beam influencing structure in the third display region and locally influences the polarization of the laser beam. In an example, beam portions of the laser beam with specific polarization are filtered, for example, downstream of the third display region. In this way, advantageously the functional states described above are combined with one another and realized in succession as it were in combination with one another. It is thus possible to form the laser beam in a particularly flexible manner and to sharpen it in particular at the same time—in particular up to the diffraction limit. The first two display regions can be used to generate a desired intensity distribution that is as sharp as possible, for example a flat-top laser beam, wherein the third display region can be used in association with the polarization separation in order to define the final form of the laser beam.

Overall, with the aid of the method, on account of the highly flexible beam forming process, it is possible to generate laser beams with very high quality in the intensity distribution, in particular with regard to outer contour and homogeneity.

In accordance with another aspect, provision is made for at least one property of a test beam coming from at least one display region, designated observed display region, of the plurality of display regions to be ascertained, wherein the beam influencing structure of the at least one observed display region is changed depending on the at least one ascertained property. The test beam can be coupled out from the beam path. This can be carried out, as has been explained in association with the diagnosis device, with the aid of the output coupling optical unit, the diagnosis device and/or the control device. In this case a closed control loop for the beam forming can be realized.

It is also possible for a plurality of display regions, for example the first display region and the second display region, or the second display region and the third display region, or the first display region and the third display region, or the first display region, the second display region and the third display region, to be correspondingly observed, either temporally successively, for example, by refocusing or some other changeover of the output coupling optical unit, or simultaneously, in particular by providing a plurality of output coupling optical units, or by simultaneously illuminating a plurality of display regions, in particular all display regions, with the test beam and simultaneously evaluating the test beam, as described above.

A test beam, e.g. a light beam that is provided in addition to the laser beam and is different than the latter can be used. The light beam can have a different wavelength than the laser beam; alternatively, as test beam, a partial beam of the laser beam is coupled out from the beam path.

However, it is also possible for the laser beam itself to be used as test beam.

In accordance with a further aspect—as an alternative to and separately from the method steps explained above, or in combination with at least one of the method steps explained above—a method for calibrating the light modulator is provided, wherein the light modulator is calibrated by control of the light modulator being tuned over a control interval, wherein for at least two control regions of the light modulator an intensity, assigned to the respective control region, of a test beam interacting with the light modulator, depending on the control of the light modulator, is detected by means of an optical recording device of the diagnosis device, wherein the respective intensities in the case of identical control are compared with one another, and wherein a correction of the control for the at least two control regions is ascertained on the basis of the comparison. In particular, a correction mask can be created. Said correction mask can be transmitted—in real time or in stored form—to the control device of the apparatus in order to control the light modulator in a calibrated manner.

The calibration method can be carried out in a manner such as has already been explained above in association with the correspondingly configured diagnosis device.

Preferably, the diagnosis device has between the light modulator and the recording device a polarization separating device configured to carry out polarization filtering of differently polarized beam portions of the test beam, wherein, if an in particular linear polarization of the test beam is aligned on the light modulator—for example, relative to the light modulator—such that the light modulator changes the polarization state of the test beam depending on the control thereof, a phase shift between intensity profiles of the at least two control regions, said intensity profiles being detected depending on the control, is determined, the correction being ascertained depending on the phase shift.

In accordance with another aspect, provision is made for ascertaining—locally or globally—the correction of the control of a plurality of control regions depending on a beam parameter and/or a beam effect of the test beam on the light modulator, wherein the beam parameter can be selected from a group consisting of: a fluence, an intensity, and an average power; the beam effect can be a temperature. This can be carried out in particular in addition or as an alternative to the above-described ascertainment of the correction for the different control regions depending on the control thereof.

In accordance with a further aspect, provision is made for a workpiece to be irradiated by the laser beam downstream of the light modulator. This can be done by means of the processing optical unit, for example in the manner that has already been explained in association with the processing optical unit. In this respect, the advantages already explained above are afforded as well.

Finally, the object is also achieved by providing a method for forming a laser beam, wherein the laser beam is caused to interact with a controllable spatial light modulator, wherein at least one property of a test beam coming from the light modulator is ascertained, wherein the light modulator is controlled depending on the at least one ascertained property. In this way, control, in particular closed-loop control, of at least one property of the laser beam influenced by the light modulator is created, such that said laser beam can be formed with high flexibility and accuracy. The test beam can be coupled out from a beam path of the laser beam.

As test beam, an additionally provided light beam that is different than the laser beam is can be used, said light beam preferably having a different wavelength than the laser beam. In accordance with one embodiment, said light beam can be dichroically coupled out from a beam path of the laser beam. Alternatively, as test beam, a partial beam of the laser beam can be coupled out from the beam path of the laser beam—for example, by means of a partially reflective mirror or a diffractive optical element.

The test beam can have the same beam path as the laser beam at least in the region of the light modulator.

The method can be carried out in that manner that has been explained above in association with the diagnosis device and/or the output coupling optical unit. In this respect, in particular the advantages already explained above there are afforded as well.

DESCRIPTION OF DRAWINGS

The invention is explained in greater detail below with reference to the drawing, in which.

DETAILED DESCRIPTION

Figure 1:
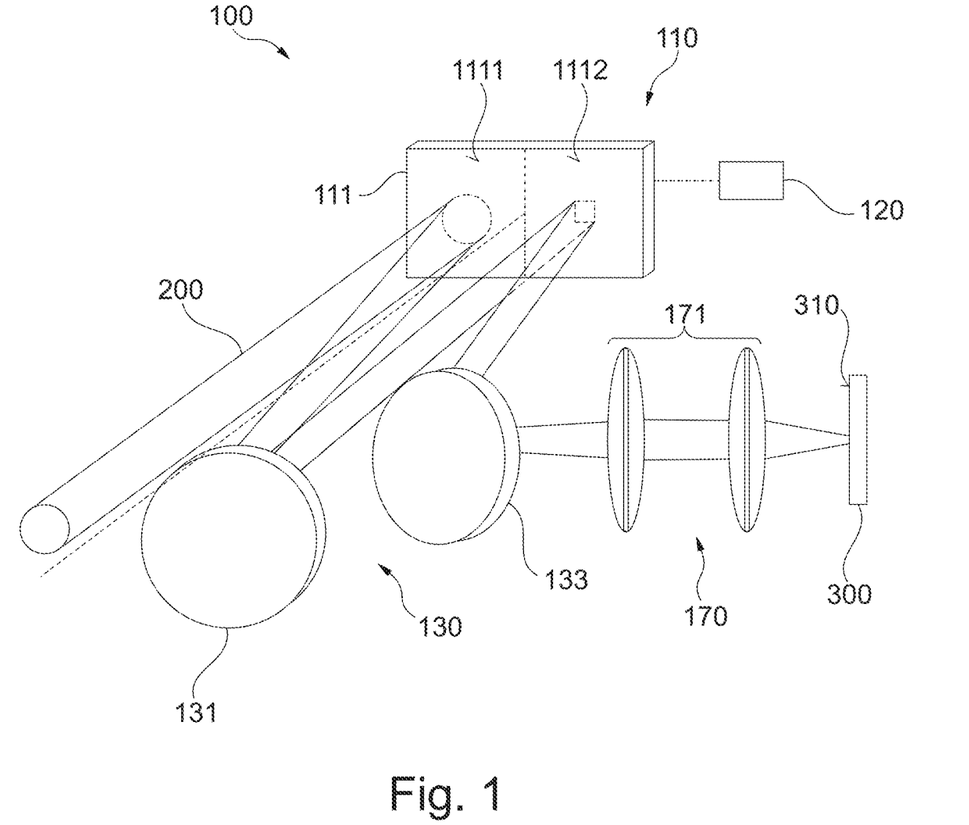
FIG. 1 shows a schematic illustration of a first exemplary embodiment of an apparatus for forming a laser beam.

FIG. 1 shows a schematic illustration of a first exemplary embodiment of an apparatus 100 for forming a laser beam 200, said apparatus comprising a controllable spatial light modulator 110, and also a control device 120 configured for controlling the light modulator 110. The control device 120 is operatively connected in particular to the light modulator 110 for the control thereof. In an embodiment, the light modulator 110 is embodied as a liquid crystal display. The control device 120 can be configured for electronic, e.g. digital, control of the light modulator 110. The control device 120 can be freely programmable.

The apparatus 100 additionally comprises a beam guiding optical unit 130.

The control device 120 is configured to split a display plane 111 of the light modulator 110 into a plurality of display regions and to represent a first beam influencing structure in at least one first display region 1111 of the plurality of display regions and a second beam influencing structure in a second display region 1112 of the plurality of display regions 1111, 1112. The beam guiding optical unit 130 is configured to cause the laser beam 200 to interact, along the direction of propagation thereof, firstly with the first display region 1111 and then with the second display region 1112.

In this case, in the exemplary embodiment illustrated here, the beam guiding optical unit 130 has a first mirror 131 arranged to direct the laser beam 200 coming from the first display region 1111 to the second display region 1112. It is possible additionally to provide an imaging optical apparatus having at least one imaging optical element between the first display region 1111 and the second display region 1112 in the beam path of the laser beam 200, for example a lens. However, it is possible for the mirror 131 to be configured as an imaging optical element. Here the first display region 1111 and the second display region 1112 are preferably arranged in each case in a focal plane of the imaging optical element or of the imaging optical apparatus, such that a 2f apparatus is realized. Alternatively, it is possible for the first display region 1111 to have imaging properties, wherein the second display region 1112 can be arranged in a focal plane of the first display region 1111, a 1f apparatus being realized in this way. However, it is also possible to realize a higher multiple of a 2f apparatus, in particular with a Fourier plane being generated as last focal plane. In particular, in an embodiment, it is possible to realize a 6f apparatus, for example with at least one spatial filter.

The beam guiding optical unit 130 here additionally has a second mirror 133, which deflects the laser beam 200 downstream of the second display region 1112.

In the context of a method for forming the laser beam 200, the latter is firstly caused to interact with the first display region 1111, wherein said laser beam is then caused to interact with the second display region 1112. By controlling the light modulator 110, a first beam influencing structure is generated in the first display region 1111 and a second, e.g. different, beam influencing structure is generated in the second display region 1112.

In particular in the first exemplary embodiment of the apparatus 100 illustrated here, in a first functional state of the apparatus 100, a phase influencing structure is in each case generated as beam influencing structure both in the first display region and in the second display region, wherein the first phase influencing structure in the first display region can influence a first amplitude distribution of the laser beam after a first propagation distance, for example in the plane of the second display region 1112. The second phase influencing structure in the second display region 1112 increases the uniformity of a phase distribution in a cross-sectional plane of the laser beam 200. Alternatively or additionally, the phase influencing structure in the second display region 1112 influences a second amplitude distribution after a second propagation distance, for example on a target plane or processing plane 310.

It is possible for a flat-top intensity distribution of the laser beam 200 to be generated on the second display region 1112 by a first phase influencing structure, wherein the second phase influencing structure smooths a phase curvature of the flat-top and thus levels the wavefront of the laser beam 200, and/or sets a specific propagation behavior or specific depth of field of the laser beam 200, and/or influences a spatial angular distribution of the laser beam 200, and/or deliberately influences a homogeneity or inhomogeneity of the laser beam 200, and/or influences, e,g, sharpens, an outer contour of the laser beam 200.

The apparatus 100 preferably comprises a processing optical unit 170 arranged and configured to guide the laser beam 200 coming from the light modulator 110 onto a workpiece 300, for example onto the processing plane 310 of the workpiece 300, which at the same time is also referred to as a target plane. In an embodiment, the processing optical unit 170 is embodied as a telescope 171, in one example as a 4f telescope, which images the second display region 1112 onto the processing plane 310 in such a way that the electric field of the laser beam 200 in the plane of the second display region 1112 both in terms of phase and in terms of amplitude corresponds exactly to the electric field in the processing plane 310, if appropriate apart from a magnification, reduction and/or change in polarization.

Consequently, in the context of the method, the workpiece 300 is irradiated by the laser beam 200 downstream of the light modulator 110.

Figure 2:
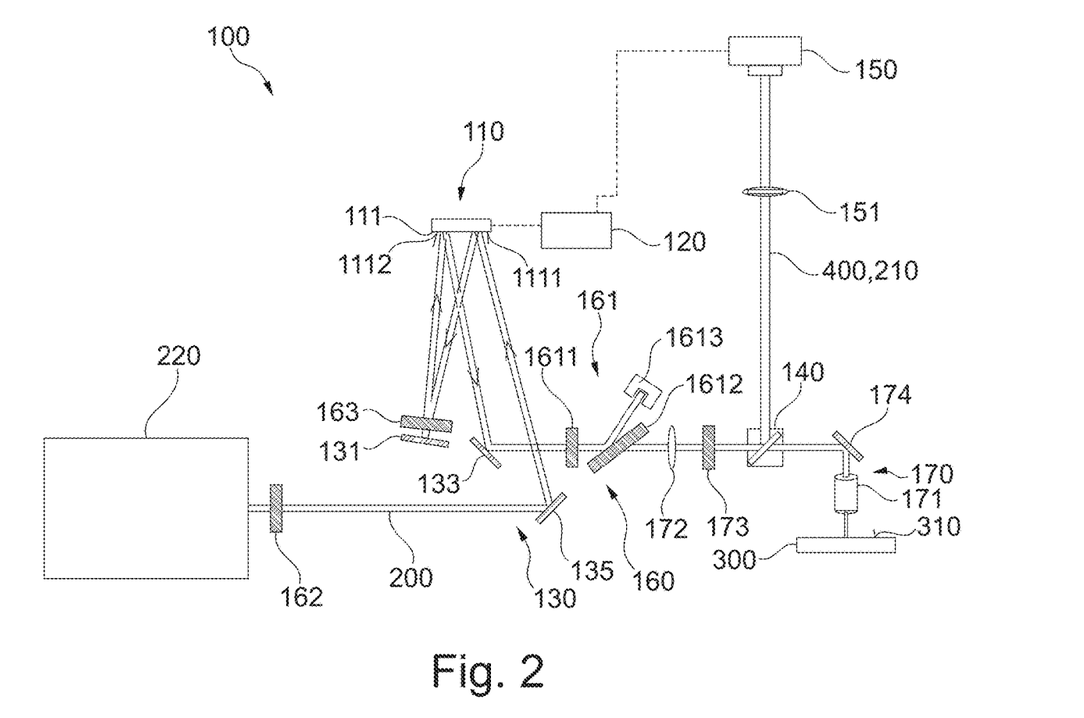
FIG. 2 shows a schematic illustration of a second exemplary embodiment of an apparatus for forming a laser beam.

FIG. 2 shows a schematic illustration of a second exemplary embodiment of the apparatus 100. Identical and functionally identical elements are provided with the same reference signs in all of the figures, and so in each case in this respect reference is made to the description above. FIG. 2 illustrates a laser beam source 220, from which the laser beam 200 emanates and which generates the laser beam 200. The laser beam source 220 can be embodied in particular as an ultrashort pulse laser configured to generate laser pulses with a temporal pulse width of the order of magnitude of picoseconds to femtoseconds, for example as an MOPA fiber laser.

In the second exemplary embodiment, an output coupling optical unit 140 is provided, which can readily also be provided in the first exemplary embodiment, just that it is not explicitly illustrated there. The output coupling optical unit 140 is configured and arranged to direct a test beam 400 coming from a display region 1111, 1112 of the plurality of display regions 1111, 1112 onto a diagnosis device 150. In the exemplary embodiment illustrated here, the test beam 400 is a partial beam 210 of the laser beam 200, wherein the output coupling optical unit 140 is embodied as a partly transmissive mirror, which is preferably configured to couple out between 0.01% and 10%, preferably less than 1%, preferably less than 0.01%, of the power of the laser beam 200 from the beam path and to direct it into the diagnosis device 150.

Alternatively, it is possible for the test beam 400 used to be an additional test beam that is different than the laser beam 200 and that can be emitted by a laser diode or LED for example. Preferably, said additional test beam 400 propagates at least regionally along the same beam path as the laser beam 200, in particular between the light modulator 110 and the output coupling optical unit 140. In this case, the additional test beam 400 preferably has a different wavelength than the laser beam 200. In this case, the output coupling optical unit 140 is preferably embodied as a dichroic mirror which, in a targeted manner, couples out the wavelength of the test beam 400 and transmits the laser beam 200.

The diagnosis device 150 can be embodied as a combination of a recording device having an evaluation device, for example as a camera in combination with a computing device, in particular as a camera with an integrated computing device.

The diagnosis device 150 can have an imaging optical element for imaging an observed display region 1111, 1112 onto an image plane of the diagnosis device 150, here in particular an output coupling lens 151. The latter here can image the display region 1111, 1112 to be observed, in interaction with a processing lens 172, which will also be explained below, onto the image plane of the diagnosis device 150. The imaging region 1111, 1112 to be observed can be selected by adapting the optical imaging properties of the output coupling lens 151 and/or the processing lens 172, for example by refocusing.

The diagnosis device 150 can be operatively connected to the control device 120 in order to control the light modulator 110 depending on at least one property of the test beam 400, for example an intensity distribution or amplitude distribution, a phase distribution, and/or a polarization distribution of the test beam 400, which is ascertained by the diagnosis device 150 in the course of the evaluation. In this way, it is possible to realize a closed control loop for controlling the at least one property of the test beam 400 and thus at the same time also of the laser beam 200.

The diagnosis device 150 can be configured to calibrate the light modulator 110 by the control of the light modulator 110 being tuned over a control interval, wherein for at least two control regions of the light modulator 110 an intensity of the test beam 400 assigned to the respective control region, depending on the control of the light modulator 110, is detected by means of the recording device, wherein the respective intensities in the case of identical control are compared with one another, and wherein a correction of the control for the at least two control regions is ascertained on the basis of the comparison.

The diagnosis device 150 can be configured, if a linear polarization of the test beam 400 is oriented on the light modulator 110—e,g, relative to the light modulator 110—such that the light modulator 110 changes the polarization state of the test beam 400 depending on its control, to determine a phase shift between intensity profiles of the at least two control regions that are detected depending on the control, and to ascertain the correction dependent on the phase shift.

The diagnosis device 150 can bean configured to ascertain—globally or locally—the correction of the control for a plurality of control regions depending on a beam parameter and/or a beam effect of the test beam 400 on the light modulator 110, wherein the beam parameter can be selected from a group consisting of: a fluence, an intensity, and an average power; the beam effect is preferably a temperature.

In the second exemplary embodiment, the apparatus 100 comprises a beam forming optical unit 160 arranged and configured to change, in particular to rotate, a polarization, in particular a linear polarization, of the laser beam 200 between the first display region 1111 and the second display region 1112. In this case, the beam forming optical unit 160 here has a first $\lambda/2$ plate 162, which imparts a first linear polarization aligned in a defined manner on the laser beam 200 upstream of the first display region 1111. The beam forming optical unit additionally has a first $\lambda/4$ plate 163 arranged upstream of the first mirror 131 in such a way that the laser beam 200 passes through it twice on the path of said laser beam from the first display region 1111 to the second display region 1112. With the aid of the first $\lambda/4$ plate, the first linear polarization can be rotated to form a second linear polarization, with which the laser beam impinges on the second display region 1112. In this case, the first linear polarization can be aligned parallel to a particular crystal axis of the two crystal axes of the preferably birefringent crystals of the light modulator 110, such that the polarization of the laser beam 100 is not changed in the first display region 1111.

The polarization of the laser beam 200 is rotated by the first $\lambda/4$ plate 163 in such a way that the second linear polarization is no longer aligned parallel to the specific crystal axis of the crystals, such that now the polarization of the laser beam 200 can be changed, e.g. rotated locally, for example pixel by pixel, in the second display region 1112.

In the exemplary embodiment illustrated here, the beam forming optical unit 160 has downstream of the second display region 1112 a polarization separating device 161 arranged and configured to filter and/or to separate from one another differently polarized beam portions of the laser beam 200 coming from the second display region 1112. Consequently, the laser beam 200 can be formed arbitrarily with high definition; however, intensity profiles can also be represented.

The polarization separating device 161 has a thin-film polarizer 1612, which transmits beam portions with specific polarization and reflects beam portions with specific other polarization. The polarization separating device 161 additionally has a beam dump 1613, into which undesired beam portions are guided by the thin-film polarizer 1612 and are annihilated there. Furthermore, the beam forming optical unit 161 has a second $\lambda/2$ plate 1611, by means of which the polarization changed by the light modulator can be aligned with the thin-film polarizer. Additionally or alternatively, the extent to which undesired beam portions are deflected by the thin-film polarizer 1612 can be set by means of the preferably adjustable $\lambda/2$ plate.

In the exemplary embodiment illustrated here, the laser beam 200 is deflected between the first $\lambda/2$ plate 162 and the first display region 1111 by means of a third mirror 135.

The beam forming optical unit 160 can be configured to be switchable between a first, switched-off functional state and a second, switched-on functional state by virtue of at least one optical element of the beam forming optical unit 160 being displaceable spatially into the beam path of the laser beam 200 or out of the beam path, and/or switchable between two switching states in the beam path of the laser beam 200. By way of example, in accordance with one configuration, the first $\lambda/4$ plate 63 can optionally be removed from the beam path and be displaced into the beam path, or it can be switched back and forth between a polarization-rotating state, in particular a polarization-rotating angular position, and a polarization-maintaining state, in particular a polarization-maintaining angular position. A correspondingly switchable optical element can also be embodied as a $\lambda/2$ plate or delay plate on the basis of liquid crystals.

The processing optical unit 170 also has here, besides the telescope 171, a fourth mirror 174 for deflecting the laser beam 200, the processing lens 172, and additionally a second $\lambda/4$ plate 173, wherein circularly polarized light can be generated by means of the $\lambda/4$ plate 173. Even more complex polarization states can be representable. By way of example, the processing optical unit can also have an s-waveplate or some other suitable element in order to generate in particular vectorially polarized radiation, for example radially polarized or azimuthally polarized radiation.

In the first, switched-off functional state of the beam forming optical unit 160, the first functional state of the apparatus 100 is preferably realized, which functional state was explained above.

In the second, switched-on functional state, a second functional state of the apparatus 100 is preferably realized, in which functional state a phase influencing structure is generated as first beam influencing structure in the first display region 1111 and influences an amplitude distribution of the laser beam 200, wherein a polarization of the laser beam 200 is changed between the first display region 1111 and the second display region 1112, wherein a polarization influencing structure is generated as second beam influencing structure in the second display region 1112 and locally influences the polarization of the laser beam 200, wherein beam portions of the laser beam 200 with specific polarization can be filtered downstream of the second display region 1112.

Preferably, switching over between the first functional state and the second functional state is effected on the apparatus 100.

In the context of the method, at least one property of the test beam 400 can be ascertained by means of the diagnosis device 150, wherein the first beam influencing structure and/or the second beam influencing structure are/is changed depending on the at least one ascertained property. For this purpose, the test beam 400 is can be coupled out from the beam path.

The laser beam 200 can be caused to interact with the controllable spatial light modulator 110, wherein at least one property of the test beam 400 coming from the light modulator 110 is ascertained by means of the diagnosis device 150, wherein the light modulator 110 is controlled depending on the at least one ascertained property. For this purpose, the test beam 400 is can be coupled out from the beam path.

Figure 3:
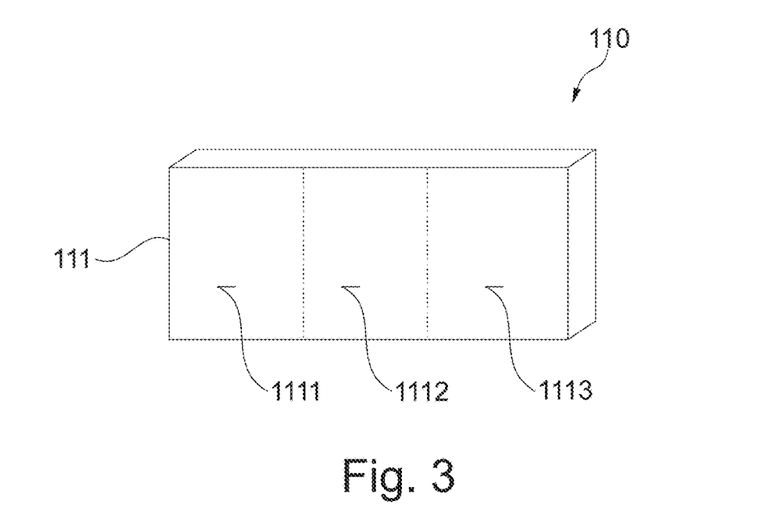
FIG. 3 shows a schematic illustration of a detail of a third exemplary embodiment of an apparatus for forming a laser beam.

FIG. 3 shows a schematic illustration of a detail of a third exemplary embodiment of the apparatus 100. In this case, here the display plane 111 of the light modulator 110 is divided into three display regions 1111, 1112, 1113, wherein the laser beam 200 (not illustrated here) is caused to interact with the third display region 1113 downstream of the second display region 1112. A third beam influencing structure, which can be different than the first beam influencing structure and the second beam influencing structure, is generated in the third display region 1113 by control of the light modulator 110. In this case a phase influencing structure can be generated as beam influencing structure both in a first display region 1111 and in a second display region 1112, wherein the phase influencing structure in the first display region 1111 influences a first amplitude distribution of the laser beam 200 after a first propagation distance and the phase influencing structure in the second display region 1112 increases the uniformity of a phase distribution in a cross-sectional plane of the laser beam 200 or influences a second amplitude distribution after a second propagation distance, e.g. on the third display region 1113. In this case, a polarization of the laser beam 200 is changed between the second display region 1112 and the third display region 1113, e.g. by means of the beam forming optical unit 160 illustrated in FIG. 2, wherein a polarization influencing structure is generated as third beam influencing structure in the third display region 1113 and locally influences the polarization of the laser beam 200, wherein beam portions of the laser beam 200 with specific polarization can be filtered downstream of the third display region 1113 for example using the polarization separating device 161 in accordance with FIG. 2.

In FIG. 3, the display plane 111 of the light modulator 110 is divided, for example, symmetrically into the three display regions 1111, 1112, 1113. Alternatively, it is also possible for the display plane 111 to be divided asymmetrically into the different display regions 1111, 1112, 1113. In this case, for example, the second display region 1112 and the third display region 1113 can also be chosen to be smaller than the first display region 1111. Moreover, the different display regions 1111, 1112, 1113 need not necessarily be arranged linearly next to one another; other apparatuses are also suitable, for example the splitting of the display plane 111 into a first region, which comprises the first display region 1111, and into a second region, which is arranged next to that and which then comprises the second display region 1112 and the third display region 1113 one above the other.

The imaging of the first display region 1111 onto the second display region 1112 can be effected by means of a 2f or 6f apparatus. The imaging of the second display region 1112 onto the third display region 1113 can be effected by means of a 4f or 8f apparatus. Here an imaging of the second display region 1112 onto the third display region 1113 can be realized, hence an image plane is generated.

Overall, a compact and flexible possibility for forming the laser beam 200 is provided in accordance with the technical teaching disclosed here.

What is claimed is:

1. An laser beam forming apparatus, comprising:
    a controllable spatial light modulator;
    a control device for controlling the light modulator; and
    a beam guiding optical unit; wherein,
    the control device is configured to split a display plane of the light modulator into a plurality of display regions and to represent a first beam influencing structure in at least one first display region of the plurality of display regions and a second beam influencing structure in a second display region of the plurality of display regions;
    the beam guiding optical unit is configured to cause the laser beam to interact with the first display region and then with the second display region; and
    a beam forming optical unit configured to change a polarization of the laser beam between the first display region and the second display region.

2. The apparatus of claim 1, wherein the beam guiding optical unit has at least one mirror arranged downstream from the first display region to direct the laser beam to the second display region.

3. The apparatus of claim 1, further comprising a diagnosis device configured to determine at least one property of a test beam from at least one display region of the plurality of display regions.

4. The apparatus of claim 3, wherein the diagnosis device is operatively connected to the control device to control the light modulator depending on the at least one determined property of the test beam.

5. The apparatus of claim 3, further comprising an output coupling optical unit configured to direct the test beam from the at least one display region of the plurality of display regions onto the diagnosis device.

6. The apparatus of claim 1, wherein the beam forming optical unit comprises a polarization separating device configured to separate differently polarized beam portions of the laser beam coming from the second display region at least partly from one another.

7. The apparatus of claim 1, wherein the beam forming optical unit is configured to be switchable between a first, switched-off functional state and a second, switched-on functional state by virtue of at least one optical element of the beam forming optical unit being:
    displaceable spatially into a beam path of the laser beam and out of the beam path; or
    switchable between two switching states in the beam path of the laser beam.

8. The apparatus of claim 1, further comprising a processing optical unit configured to guide the laser beam coming from the light modulator onto a workpiece.

9. The apparatus of claim 3, wherein the diagnosis device is configured to calibrate the light modulator by the control of the light modulator being tuned over a control interval further comprising
- detecting, using a recording device, for at least two control regions of the light modulator an intensity of the test beam assigned to the respective control region;
- comparing the respective intensities with one another; and,
- correcting the control for the at least two control regions on the basis of the compared intensities.

10. The apparatus of claim 9, further comprising:
- changing, depending on the control of the light modulator, a polarization state of the test beam;
- determining a phase shift between intensity profiles of the at least two control regions that are detected depending on the control; and,
- applying the correction dependent on the phase shift.

11. The apparatus of claim 9, wherein the diagnosis device is configured to determine the correction of the control for a plurality of control regions depending on a beam parameter or a beam effect of the test beam on the light modulator.

12. A method of forming a laser beam, the method comprising:
- interacting, by the laser beam, with a first display region of a controllable spatial light modulator;
- interacting, by the laser beam, with a second display region of the controllable spatial light modulator;
- generating a first beam influencing structure in the first display region; and
- generating a second beam influencing structure in the second display region by control of the light modulator; the method comprising
- generating, in a first functional state, a phase influencing structure, as beam influencing structure both in the first display region and in the second display region; wherein,
- influencing, by phase influencing structure, in the first display region a first amplitude distribution of the laser beam after a first propagation distance and the phase influencing structure in the second display region; and,
- increasing uniformity of a phase distribution in a cross-sectional plane of the laser beam; or
- influencing a second amplitude distribution after a second propagation distance.

13. The method of claim 12, further comprising:
- generating, in a second functional state, a phase influencing structure as first beam influencing structure in the first display region; and
- influencing an amplitude distribution of the laser beam, wherein a polarization of the laser beam is changed between the first display region and the second display region; and
- generating, in the second display region, a second beam influencing structure, the second beam influencing structure comprising a polarization influencing structure; and
- influencing, by the second beam influencing structure, the polarization of the laser beam, wherein beam portions of the laser beam with specific polarization are filtered downstream of the second display region.

14. The method of claim 13, further comprising switching between the first functional state and the second functional state.

15. The method of claim 12, further comprising:
- interacting, by the laser beam downstream of the second display region, with a third display region of the controllable spatial light modulator;
- generating a third beam influencing structure, in the third display region by control of the light modulator;
- generating a phase influencing structure as beam influencing structure both in a first display region and in a second display region; wherein,
- influencing, by the phase influencing structure in the first display region, a first amplitude distribution of the laser beam after a first propagation distance and the phase influencing structure in the second display region;
- increasing uniformity of a phase distribution in a cross-sectional plane of the laser beam; or
- influencing a second amplitude distribution after a second propagation distance;
- changing, a polarization of the laser beam between the second display region and the third display region;
- generating a polarization influencing structure as a third beam influencing structure in the third display region;
- influencing locally, by the third beam influencing structure, the polarization of the laser beam; and,
- filtering beam portions of the laser beam with specific polarization downstream of the third display region.

16. The method of claim 12 further comprising:
- determining a property of a test beam coming from at least one observed display region of a plurality of display regions; wherein,
- the beam influencing structure of the at least one observed display region is changed depending on the at least one determined property.

17. The method of claim 12, wherein a workpiece is irradiated with the laser beam downstream of the light modulator.

18. An laser beam forming apparatus, comprising:
- a controllable spatial light modulator;
- a control device for controlling the light modulator; and
- a beam guiding optical unit; wherein,
- the control device is configured to split a display plane of the light modulator into a plurality of display regions and to represent a first beam influencing structure in at least one first display region of the plurality of display regions and a second beam influencing structure in a second display region of the plurality of display regions;
- the beam guiding optical unit is configured to cause the laser beam to interact with the first display region and then with the second display region; and
- a diagnosis device configured to determine at least one property of a test beam from at least one display region of the plurality of display regions;
- wherein the diagnosis device is configured to calibrate the light modulator by the control of the light modulator being tuned over a control interval further comprising
- detecting, using a recording device, for at least two control regions of the light modulator an intensity of the test beam assigned to the respective control region;
- comparing the respective intensities with one another; and,
- correcting the control for the at least two control regions on the basis of the compared intensities.

* * * * *